Feb. 17, 1925. 1,527,099
A. R. WILCOX
LIQUID SAMPLING DEVICE
Filed Nov. 28, 1921 2 Sheets-Sheet 1

Arthur R. Wilcox
INVENTOR

BY Victor J. Evans
ATTORNEY

WITNESS:

Feb. 17, 1925.                                                 1,527,099
A. R. WILCOX
LIQUID SAMPLING DEVICE
Filed Nov. 28, 1921        2 Sheets-Sheet 2
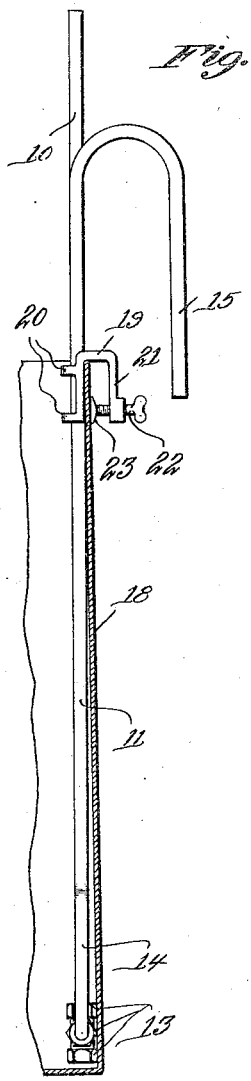
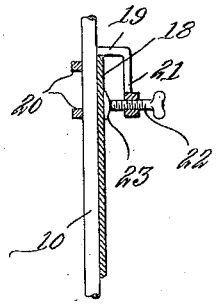
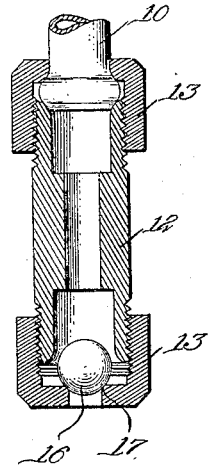
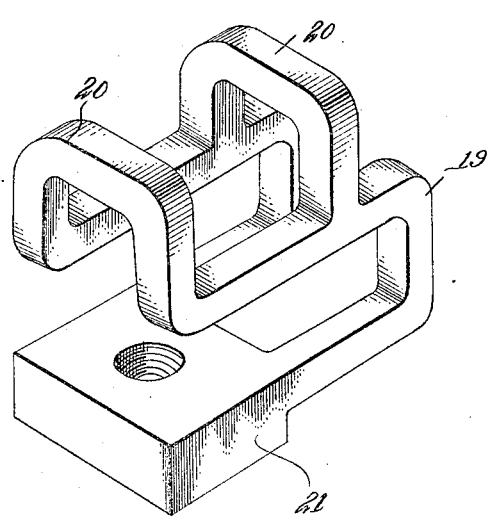
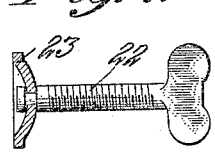

Patented Feb. 17, 1925.

1,527,099

UNITED STATES PATENT OFFICE.

ARTHUR R. WILCOX, OF BIRCHARDVILLE, PENNSYLVANIA.

LIQUID-SAMPLING DEVICE.

Application filed November 28, 1921. Serial No. 518,302.

*To all whom it may concern:*

Be it known that I, ARTHUR R. WILCOX, a citizen of the United States, residing at Birchardville, in the county of Susquehanna and State of Pennsylvania, have invented new and useful Improvements in Liquid-Sampling Devices, of which the following is a specification.

This invention relates to devices for taking samples of liquids, such as milk, cream and so forth and is especially designed for use at creameries and milk stations for the purpose of taking samples of the milk and cream delivered, for testing.

In taking samples of milk and cream for testing purposes, it is important that the sample is always in proportion to the weight of the milk or cream. In other words, the sample from a can containing 600 pounds of milk should be twice the quantity of a sample from a can containing 300 pounds and the sample should also be taken from the top to the bottom of the milk.

In creameries and milk stations, it is customary to take a sample of the milk and cream delivered each day and to place this sample in a sample bottle and at the expiration of a period of about 15 days, to test this composite sample and to pay according to the test. It is apparent that if the sample taken each day is not in proportion to the weight of the milk, the payment will not be correct. By the use of the present invention, a sample may be taken from the top to the bottom and in exact proportion to the weight of the milk or cream and this sample held in the sampler until purposely removed, the construction of the invention being such that the sampler will be automatically opened to receive the milk and automatically closed to retain the same as it is removed from the weight can.

With the above and other objects in view, the invention further includes the following novel features and details of construction, to be hereinafter more fully described, illustrated in the accompanying drawings and pointed out in the appended claims.

In the drawings:—

Figure 2 is a view at right angles to Figure 1, the said view being taken on the line 2—2 of Figure 1.

Figure 3 is an enlarged fragmentary sectional view on the line 3—3 of Figure 1.

Figure 4 is a similar view on the line 4—4 of Figure 1.

Figure 6 is a view of a modified form of the invention.

Figure 7 is a detail view of the clamping screw.

Figure 1:
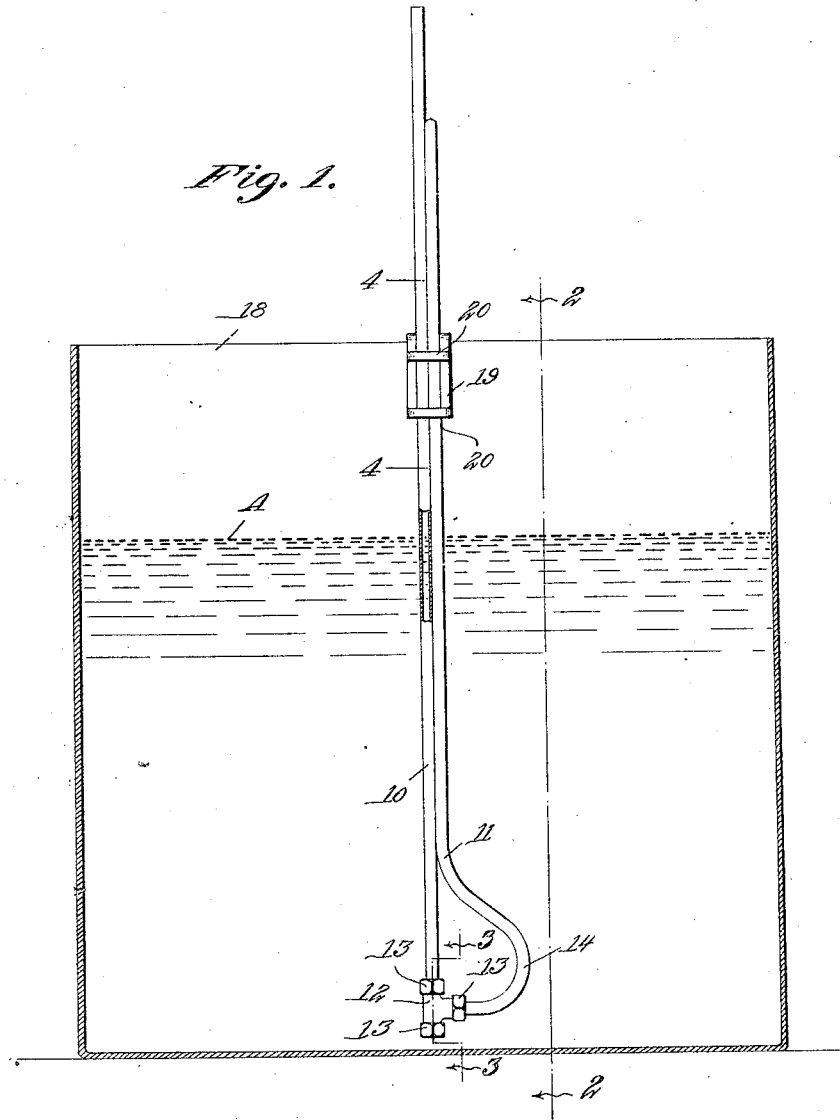
Figure 1 is an elevation of a sampler constructed in accordance with the invention, a fragmentary portion of the weight can being illustrated to show the use of the sampler.
Figure 5:
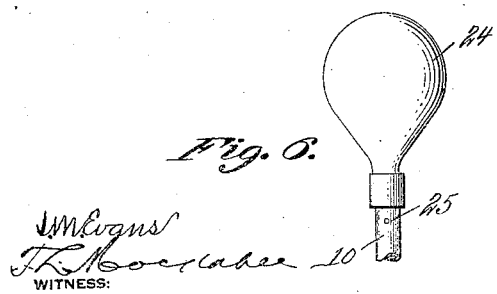
Figure 5 is a detail perspective view of the clamp for securing the sampler to a weight can.

Referring in detail to the drawings, wherein like characters of reference denote corresponding parts, the invention in its present form comprises a tube 10 which is substantially straight and which will be hereinafter referred to as the receiving tube, while connected to this tube is a tube 11, to be hereinafter referred to as the discharge tube. This last mentioned tube has its lower end connected to and in communication with the receiving tube 10 at a point adjacent the lower end of the latter, the connection being effected by a T-joint 12 and unions 13. The discharge tube 11 has its lower end curved as at 14 and extends inwardly and upwardly along the receiving tube 10 with its extremity formed into a downwardly extending discharge spout 15.

Located in the lower end of the receiving tube immediately below the point of connection of the discharge tube is a check valve, the latter being in the form of a ball 16, which is adapted to rest upon a seat 17 to close the lower end of the receiving tube.

The invention is especially designed for taking samples of milk and cream for testing purposes and to this end is adapted to be secured to the usual weight can which is indicated at 18. To accomplish this there is provided a clamp which includes a U-shaped portion 19 which receives the tubes 10 and 11 and upon which the said U-shaped portion is slidingly mounted through the medium of lugs 20. Extending from the U-shaped portion 19 of the clamp is an arm 21 and threadedly adjustable within this arm is a clamping screw 22, whose inner end is provided with a swiveled head 23 which is adapted to engage the outer face of the weight can 18.

In the use of the invention, the sampler is secured to the upper edge of the weight can in the manner shown, with the lower end of the said sampler positioned about one-fourth of an inch (more or less) from the bottom of the weight can. The liquid will then enter the receiving tube past the valve and will rise within the said tube to the level indicated by the dotted line at *a*, which indicates the level of the milk or other liquid within the can. The sample entering the tube 10 will thus be taken from the top to the bottom of the milk and will be in exact proportion to the weight of the milk. In removing the sampler from the can, the valve will be automatically closed to retain the milk within the tube, which is then discharged into a sample bottle by blowing in the upper end of the tube 10, whereupon the milk will be discharged through the spout 15.

If desired, any suitable means may be applied to the upper end of the pipe 10 for supplying air pressure for the discharge of the milk. One of such means is illustrated in Figure 6 of the drawings and consists in securing a rubber or other compressible bulb 24 to the tube 10, so that by squeezing the bulb the contents of the said tube 10 may be forced out through the discharge spout 15. A small opening 25 is provided in the tube 10 adjacent the bulb 24 so as to prevent the formation of a vacuum in the said tube and permit the liquid to enter.

The invention is susceptible of various changes in its form, proportions and minor details of construction and the right is herein reserved to make such changes as properly fall within the scope of the appended claims.

Having described the invention what is claimed is:—

1. A liquid sampling device comprising a receiving tube, an automatically operated valve located at the lower end of said tube and a discharge tube extending from the receiving tube at a point directly above the valve, said discharge tube arranged at one side of the receiving tube, and said discharge tube having its upper end bent to provide a downwardly extending discharge spout.

2. A liquid sampling device comprising a receiving tube, a T-coupling at the lower end of said receiving tube, an automatically operated valve located at the lower end of said coupling, a discharge tube extending upward at one end of said receiving tube and connected therewith at a point directly above said valve, said discharge tube at its upper end having a return bend to provide a downwardly extending discharge spout.

In testimony whereof I affix my signature.

ARTHUR R. WILCOX.